May 2, 1950

J. H. LONG 2,505,779

METHOD OF AND MEANS FOR DISTRIBUTING WEAR OF LINEAR ELECTRODES IN FACSIMILE RECORDERS EMBODYING HELICAL AND LINEAR ELECTRODES

Filed Oct. 15, 1946

JOHN H. LONG
*INVENTOR.*

BY Alfred W. Barber
ATTORNEY

Patented May 2, 1950

2,505,779

UNITED STATES PATENT OFFICE 2,505,779

METHOD OF AND MEANS FOR DISTRIBUTING WEAR OF LINEAR ELECTRODES IN FACSIMILE RECORDERS EMBODYING HELICAL AND LINEAR ELECTRODES

John H. Long, Jackson Heights, N. Y., assignor to Faximile, Inc., New York, N. Y., a corporation of Delaware Application October 15, 1946, Serial No. 703,323

5 Claims. (Cl. 346—101)

The present invention concerns facsimile recorders and, in particular, facsimile recorders employing cooperating helical and linear electrodes for recording on an electrolytic recording sheet.

One well known form of facsimile recorder consists of a helical electrode mounted on a drum and driven by a synchronous motor and a cooperating linear electrode with an electrolytic recording sheet drawn between the two electrodes. As the helical electrode is rotated a point of intersection between it and the linear electrode forms a scanning point which moves across the recording sheet. The recording sheet is drawn slowly between these electrodes to move the sheet line by line and complete the recording process. Marking of the recording sheet is accomplished by passing electric current representing the variations in density of the copy to be reproduced between the two electrodes thereby causing density changes in the chemicals in the electrolytic sheet.

The above mentioned linear electrode is preferably a thin flexible metal electrode as described in U. S. Patents Nos. 2,202,855 and 2,380,467. A preferred form of this flexible electrode is a thin metallic strip of steel or steel alloy. During recording this electrode is consumed gradually by the chemical process involved in the recording and also by mechanical abrasion. It has been found that if a long vertical black line or series of lines is reproduced in the facsimile recorder an uneven consumption of the electrode takes place since the electrode is consumed more rapidly at the point at which the line passes under it. If the blade thus becomes pitted it will bounce under the action of the rotating helical electrode, causing serious variations in pressure on the recording sheet. According to the present invention the linear electrode is moved back and forth across the paper so that chemical consumption of the blade is distributed over its length and no one part of the electrode is consumed unduly rapidly.

It is, therefore, an object of the present invention to provide a method of, and means for, evenly distributing the wear and chemical consumption of a linear printing electrode in a facsimile scanner so that the blade retains a smooth even edge throughout its life.

It is another object of the present invention to accomplish this in a simple, efficient, and inexpensive manner.

It is a further object of the present invention greatly to increase the useful life of the linear electrode of a facsimile scanner.

It is a still further object of the present invention to improve the fidelity of recording by maintaining a smoother edge on a linear recording electrode.

These and other objects of the present invention will be more apparent from a study of the detailed description of the invention as given below in connection with the various figures of the drawing.

Figure 1:
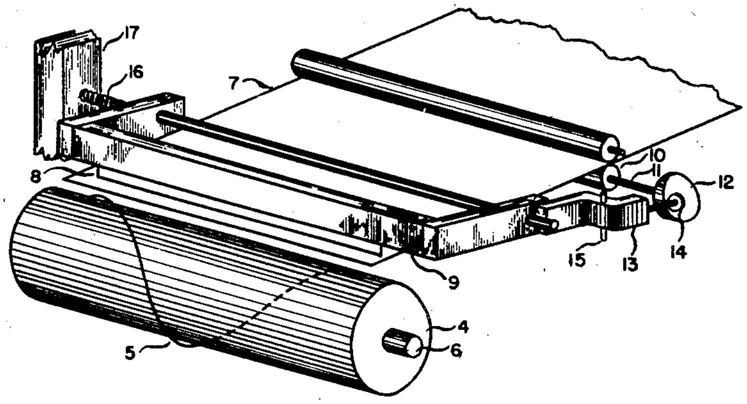
Fig. 1 shows a view in perspective of a facsimile receiving scanner, in simplified form, and embodying one form of the present invention.

Fig. 1 shows a simplified drawing of a facsimile recorder in order to clearly illustrate the present invention. A cylindrical drum 4, mounted on shaft 6, carries a helical metallic recording electrode 5 on its surface and is rotated at a predetermined constant rate of speed by a motor and gear system not shown. An electrolytic recording sheet 7 is passed over helical electrode 5 and under a linear metallic electrode 8 mounted in a holder 9. Electrolytic recording sheet 7 is advanced at a predetermined rate of speed by means of roller 10 mounted on shaft 11 and also connected to the motor through a gear system not shown. Linear electrode 8 presses upon sheet 7 and helical electrode 5 forming a path for facsimile recording current through the recording sheet. As drum 4 is rotated the point of intersection between helical electrode 5 and linear electrode 8 passes successively across sheet 7 and the slow advance of sheet 7 due to the rotation of roller 10 completes the scanning operation. The electrolytic recording sheet 7 is capable of producing markings due to the chemical combination of the metal in linear electrode 8 and the chemicals carried by the sheet. Recording sheet 7 may be prepared, for instance, as set forth in U. S. Patents Nos. 2,339,267 and 2,358,839. Variations in density to represent an original copy are produced by variable amplitude electric signals representing these variations. A dark mark is produced by a large current flow while a lighter mark is produced by a lesser current flow. A black line, for instance, may represent the maximum amount of current flow and a maximum rate of chemical combinations between linear electrode 8 and the chemicals in paper 7 and hence a maximum rate of consumption of electrode 8. It often happens with facsimile copy that a black border line will run for a considerable distance lengthwise of the sheet and hence will cause an undue chemical wear at a single point of the linear electrode 8. According to the present invention electrode 8 is oscillated back and forth across the paper 7 in order to distribute this wear. This oscillation may be accomplished, for example, by means of a shaft and lever operated from the paper drive roll 10, as shown in this figure. Shaft 11 carries a cam wheel 12 and bearing against this cam is a friction reducing wheel 14 connected to a lever arm 13, pivoted at 15, the other end of which bears against linear electrode holder 9. The rotation of cam 12 moves lever arm 13, and pushes the linear electrode in one direction while it is returned by means of compression spring 16 bearing against the recorder frame 17. The amount of motion of linear electrode produced in this way may be varied over a wide range but it has been found in practice that a motion of the order of one-quarter to one-half inch distributes the wear in such a manner that the life of the linear electrode is greatly increased and the accuracy of recording is likewise improved. Since roller 10 rotates at a relatively low rate of speed this oscillation of the linear electrode in no way affects the recording process except to distribute the wear over the length of the linear electrode.

Figure 2:
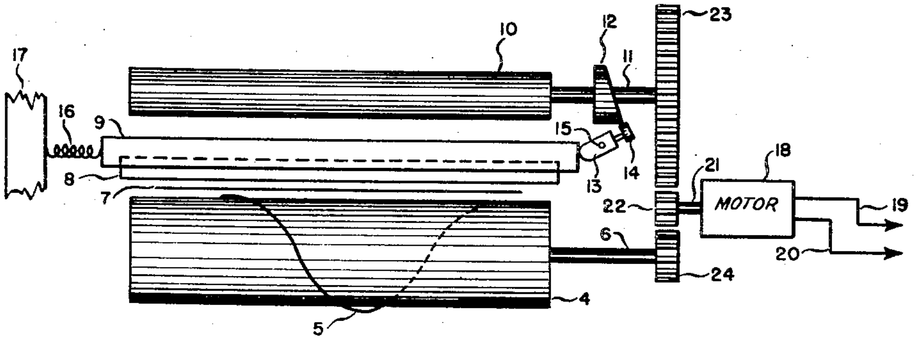
Fig. 2 shows a top view of the present invention and one form of suitable motor drive and gearing therefore.

Fig. 2 shows a top view of the present invention and includes one form of gearing arrangement for driving the various elements of the recorder. Synchronous drive motor 18 is fed by suitable synchronous currents over wires 19 and 20, and has mounted on its shaft 21, a drive gear 22. This drive gear 22 meshes with a relatively large drive gear 23 on the shaft 11 of roller 10 and a relatively small drive gear 24 mounted on the shaft 6 of drum 4. In this manner drum 4 is rotated at a suitable high speed while roller 10 is rotated at a suitable relatively low speed. The relative speeds will be determined by the rate of scanning and the number of lines per inch which are to be recorded. In this manner printer blade 8 is oscillated at a rate of speed low compared to the speed of revolution of helix 5 and will not in any way interfere or modify the scanning process.

It will be seen that by oscillating the linear electrode the chemical wear of the electrode will be distributed along its length and its edge will be maintained smooth and straight for a much longer period of time than would be the case if it were stationary. It will be appreciated that a smooth printer blade will produce a finer recording since the pressure between it and the helical electrode will be constant and will not be subject to bumping which would occur in case there were hills and valleys in the recording electrode. This distribution of the wear will also greatly increase the effective life of the linear printing electrode. This increased life is of great advantage since the linear electrode will not have to be changed for long periods of time.

While a single embodiment of the present invention has been shown and described, many variations of the present invention will be apparent to those skilled in the art within the spirit and scope of the appended claims.

What is claimed is:

1. In a recording scanner, the combination of, a helical metallic electrode, a cooperating linear metallic electrode, and means for distributing the wear of said linear electrode along its length comprising means for oscillating said linear electrode lengthwise a predetermined distance and at a predetermined rate of speed.

2. In a recorder, the combination of, a metallic helical electrode, a cooperating metallic linear electrode for recording upon an electrolytic recording sheet, means for rotating said helical electrode at a relatively high rate of speed, and means for oscillating said linear electrode along its length at a relatively low rate of speed.

3. In a recorder, the combination of, a metallic helical electrode, a cooperating metallic linear electrode for recording upon an electrolytic recording sheet, a drive roll for advancing said sheet at a predetermined rate of speed, and means for oscillating said linear electrode along its length including a lever arm and a cam device attached to said drive roller.

4. In a recorder, the combination of, a rotatable helical electrode, means for rotating said helical electrode, a linear electrode for cooperating with said helical electrode to mark a record sheet, and means for preventing selective consumption of said linear electrode including means for periodically moving said linear electrode a predetermined distance back and forth in its lengthwise direction including a coupling to said helical electrode rotating means.

5. In a recorder, the combination of, a rotatable helical electrode, means for rotating said helical electrode, a linear electrode for cooperating with said helical electrode to mark a record sheet, and means for preventing selective consumption of said linear electrode including a device coupled to said rotating means for moving said linear electrode back and forth in its lengthwise direction.

JOHN H. LONG.

REFERENCES CITED

The following references are of record in the file of this patent:

UNITED STATES PATENTS

| Number | Name | Date |
|---|---|---|
| 2,215,806 | Young | Sept. 24, 1940 |
| 2,391,912 | Magee | Jan. 1, 1946 |
| 2,421,673 | Young | June 3, 1947 |